US005619721A

United States Patent [19]

Maruko

[11] Patent Number: 5,619,721

[45] Date of Patent: Apr. 8, 1997

[54] CONTROLLING FONT DATA MEMORY ACCESS FOR DISPLAY AND NON-DISPLAY PURPOSES USING CHARACTER CONTENT FOR ACCESS CRITERIA

[75] Inventor: Kinya Maruko, Tokyo, Japan

[73] Assignee: Kabushiki Kaisha Toshiba, Kawasaki, Japan

[21] Appl. No.: 433,132

[22] Filed: May 3, 1995

Related U.S. Application Data

[63] Continuation of Ser. No. 882,865, May 14, 1992, abandoned.

[30] Foreign Application Priority Data

May 15, 1991 [JP] Japan .................................... 3-110312

[51] Int. Cl.$^{6}$ ........................................ G06F 17/21

[52] U.S. Cl. ........................................ 395/805

[58] Field of Search ............................ 395/110, 115, 395/116, 150, 166

[56] References Cited

U.S. PATENT DOCUMENTS

| | | | |
|---|---|---|---|
| 3,911,404 | 10/1975 | O'Neill, Jr. | 345/192 |
| 4,115,765 | 9/1978 | Hartke | 345/202 |
| 4,573,812 | 3/1986 | Kondo | 395/108 |
| 4,613,852 | 9/1986 | Maruko | 345/188 |
| 4,879,666 | 11/1989 | Kembo | 395/110 X |
| 4,881,180 | 11/1989 | Nishiyama | 395/110 |
| 4,958,299 | 9/1990 | Akada | 395/116 X |
| 4,959,793 | 9/1990 | Suzuki et al. | 395/150 |
| 4,967,374 | 10/1990 | Nomura et al. | 395/150 |
| 4,987,550 | 1/1991 | Leonard et al. | 395/150 |
| 4,998,210 | 3/1991 | Kadono et al. | 345/195 |
| 5,167,013 | 11/1992 | Hube et al. | 395/110 |
| 5,175,811 | 12/1992 | Sone et al. | 395/150 |
| 5,208,908 | 5/1993 | Harrison et al. | 395/150 |
| 5,241,642 | 8/1993 | Norsworthy et al. | 395/166 X |
| 5,257,351 | 10/1993 | Leonard et al. | 395/150 |
| 5,295,238 | 3/1994 | Dickson | 395/150 |
| 5,317,684 | 5/1994 | Penna | 395/150 |
| 5,327,526 | 7/1994 | Nomura et al. | 395/115 |
| 5,337,319 | 8/1994 | Furukawa et al. | 395/166 X |
| 5,345,518 | 9/1994 | Murakami | 382/232 |
| 5,347,266 | 9/1994 | Blauman et al. | 395/110 X |
| 5,444,829 | 8/1995 | Kawabata et al. | 395/150 |

FOREIGN PATENT DOCUMENTS

| | | | |
|---|---|---|---|
| 1461559 | 5/1975 | United Kingdom | G06K 15/20 |

OTHER PUBLICATIONS

Prosise, Tutor, PC Magazine, Jan. 30, 1990, pp. 311–314.

IBM Technical Disclosure Bulletin, vol. 30, No. 3, pp. 1034–1036, Aug. 1987.

*Primary Examiner*—Heather R. Herndon
*Assistant Examiner*—Anton W. Fetting
*Attorney, Agent, or Firm*—Finnegan, Henderson, Farabow, Garrett & Dunner, L.L.P.

[57] ABSTRACT

A display control system employing a character display mode. When a character code determining circuit determines, during a display period, that character code data read out from a character code data memory is a specified character code such as a space code, or when a raster address determining circuit determines that a raster address of character information displayed on a display device is a specified raster address, an address selector selects a CPU address in accordance with a selection signal output from a selector control circuit. Access to a font data memory is then performed in accordance with the selected CPU address.

18 Claims, 4 Drawing Sheets

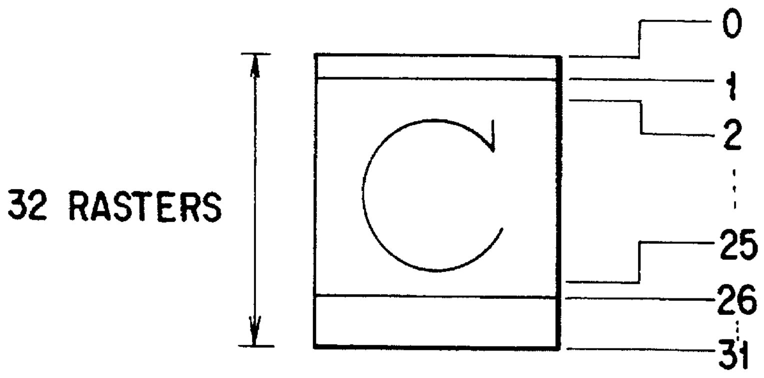
FIG. 4
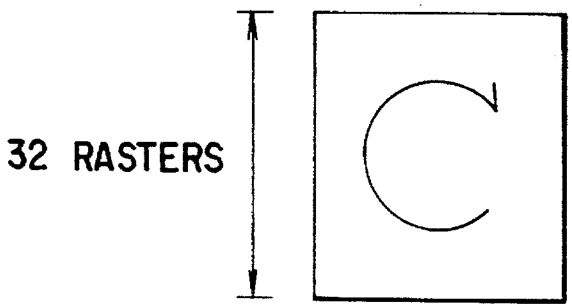
FIG. 5
| X | CHARACTER CODE |
|---|---|
X = 0 : FONT MEMORY ACCESS
X = 1 : OPTION MEMORY ACCESS
FIG. 6

CONTROLLING FONT DATA MEMORY ACCESS FOR DISPLAY AND NON-DISPLAY PURPOSES USING CHARACTER CONTENT FOR ACCESS CRITERIA

This application is a continuation of application Ser. No. 07/882,865 filed May 14, 1992, now abandoned.

BACKGROUND OF THE INVENTION

1. Field of the Invention

The present invention relates to a method and an apparatus for controlling access of a font data memory used in a display control system employing a character display mode wherein an address is produced in accordance with a character code stored in a character code data memory, font data stored in a font data memory is read out in accordance with the produced address, and the font data is displayed on a display device.

2. Description of the Related Art

In a conventional display control system employing the character display mode, a font data memory is occupied during the display period. Thus, read/write access, other than display access, to the font data memory by a CPU (Central Processing Unit), a DMA (Direct Memory Access) apparatus, or the like is allowed only in a non-display period, such as a vertical blanking period or a horizontal blanking period. As a result, much time is consumed when the CPU, DMA apparatus, or the like access the font data memory.

For example, in a display control system employing both a of the character display mode and a bit map memory display mode, the font data memory is occupied during the display period in the character display mode, as stated above. Thus, the font data memory used for the display in the bit map memory display mode is occupied only in the non-display period. Consequently, much time is required for access to the font data memory.

In order to solve the above problem, there is an idea, for example, that a font data memory exclusively used in the character display mode and a font data memory exclusively used in the bit map memory mode are both provided in the display control system. However, since the font data memory is expensive, provision of two or more font data memories prevents reduction in cost and size of the system.

Under the circumstances, there is a demand for an apparatus for controlling access of a font data memory, which enables the CPU, or the like to access the font data memory with high efficiency and is used in a display control system employing the character display mode and having only one font data memory, while ensuring normal display of the display device.

SUMMARY OF THE INVENTION

The object of the present invention is to provide a method and an apparatus for controlling access of a font data memory that enables a CPU, or the like to access the font data memory with high efficiency, and which is in a display control system employing a character display mode and having only one font data memory, while ensuring normal display of a display device.

According to one aspect of the present invention, there is provided a display control system comprising: a character code data memory, accessed in response to an address to be supplied, for storing character code data; producing means for producing, when a display address for displaying character information is supplied to the character code data memory, a font address in accordance with character code data read out from the character code data memory in response to the display address; a font data memory, accessed in response to an address to be supplied, for storing font data; character code determining means for determining whether or not the character code data read out from the character code data memory in response to the display address is a specified character code; font data producing means for producing specified font data corresponding to the specified character code when the character code data read out from the character code data memory is the specified character code; display means for displaying character information in accordance with the produced specified font data when the read out character code data is the specified character code, and for displaying character information in accordance with the font data read out from the font data memory when the read out character code data is not the specified character code; and access control means for allowing access to the font data memory in response to addresses other than the display address, while the character information is being displayed on the display means in accordance with the specified font data.

According to another aspect of the present invention, there is provided a method of controlling access to a font data memory, comprising the steps of: storing character code data in a character code data memory accessed in response to an address to be supplied; storing font data in a font data memory accessed in response to an address to be supplied; producing a font address in accordance with the character code data read out from the character code data memory in response to a display address for displaying character information, when the display address is supplied from the character code data memory; determining whether or not the character code data read out from the character code data memory in response to the display address is a specified character code; producing specified font data corresponding to the specified character code when the character code data read out from the character code data memory is the specified character code; displaying the character information in accordance with the produced specified font data when the read out character code data is the specified character code data; displaying the character information in accordance with the font data read out from the font data memory, when the read out character code data is not the specified character code; and allowing access to the font data memory in response to addresses other than the display address, while the character information is being displayed in accordance with the specified font data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG.. 1 is a block diagram showing the structure of a display control system including a font data memory access control apparatus according to a first embodiment of the present invention;

FIG. 4 shows an example of font data stored in a font data memory of the display control system shown in FIG. 1;

FIG. 5 shows an example of option font data stored in an option memory of the display control system shown in FIG. 1;

FIG. 6 shows the structure of character code data stored in a character code data memory of the display control system shown in FIG. 1.

DETAILED DESCRIPTION OF THE PREFERRED EMBODIMENTS

Embodiments of the present invention will now be described with reference to the accompanying drawings.

Figure 1:
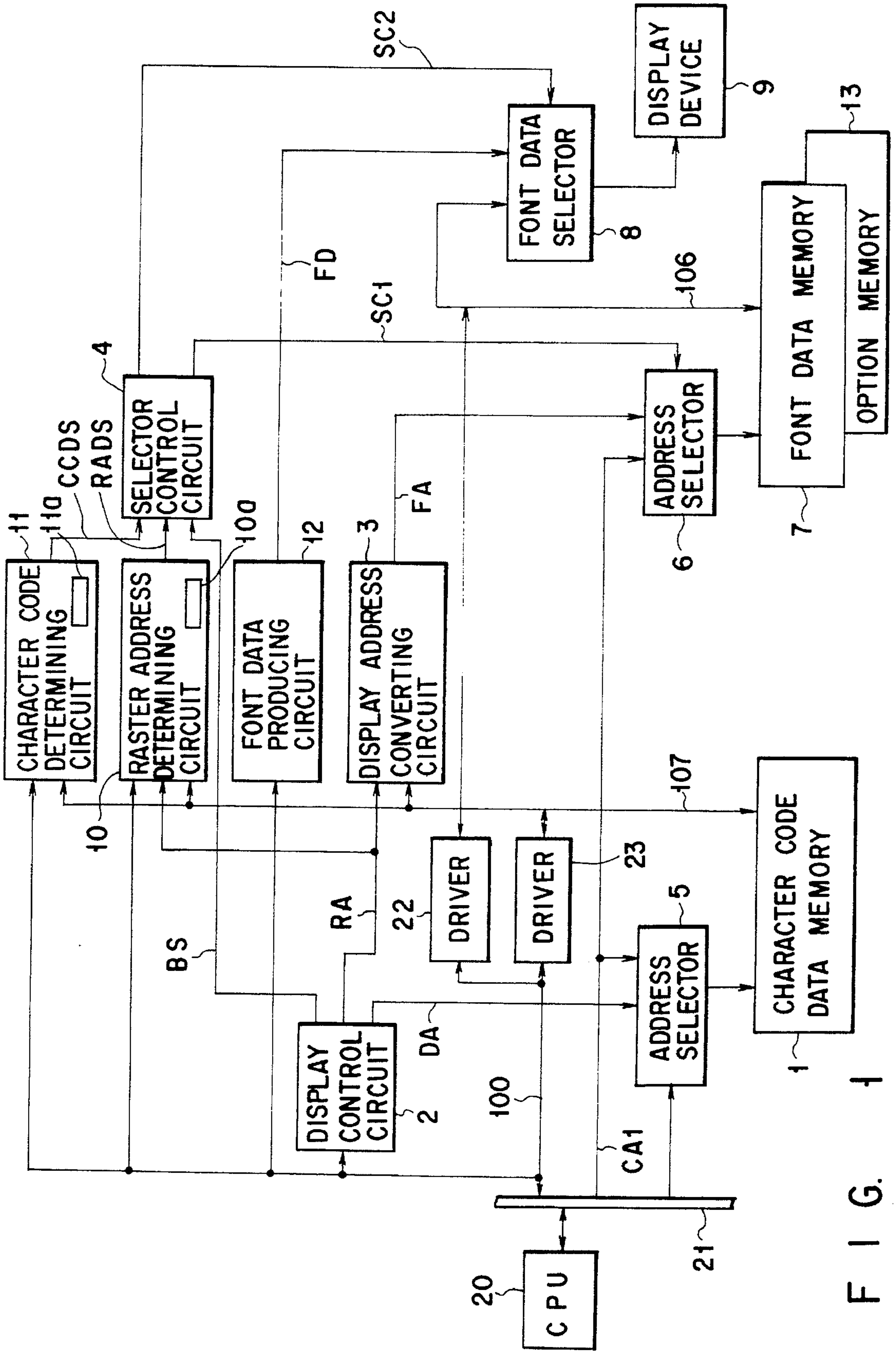

FIG. 1 is a block diagram showing the structure of a character display type display control system including a font data memory access control apparatus according to a first embodiment of the present invention. In FIG. 1, a character code data memory 1 stores character code data indicating character information to be displayed on a display device 9. During the display period in the character display mode, a display address DA is supplied from a display control circuit 2 to the character code data memory 1 via an address selector 5. In response to the display address DA, the character code data is read out from the character data memory 1 and supplied to a display address converting circuit 3, a raster address determining circuit 10, a character code determining circuit 11 and a driver 23 via a character data bus 107.

On the other hand, during the non-display period such as horizontal/vertical blanking period, other than the display period, a CPU address CA1 is supplied from a CPU (Central Processing Unit) 20 to the character code data memory 1 via the address selector 5. In response to the CPU address CA1, read/write access to the character code data memory 1 is performed selectively. In this embodiment, the CPU address CA1 is supplied from the CPU 20 to the character code data memory 1. In the present invention, however, it is possible to design the system such that an address from a DMA (Direct Memory Access) apparatus (not shown), or the like is supplied to the character code data memory 1.

The display control circuit 2 produces various display control signals such as display address signals and horizontal/vertical sync signals used in the character display mode. During the display period, a display address DA is produced to successively read out character code data stored in the character code data memory 1. The display address DA is supplied from the display control circuit 2 to the character code data memory 1 via the address selector 5. Further, a raster address RA relating to character information displayed on the display device 9 is supplied from the display control circuit 2 to the display address converting circuit 3. Furthermore, a horizontal/vertical blanking signal BS indicating the non-display period is supplied from the display control circuit 2 to a selector control circuit 4.

The display address converting circuit 3 produces a font address FA in accordance with the character code data read out from the character code data memory 1 and the raster address RA output from the display control circuit 2. The produced font address FA is supplied to a font data memory 7 via an address selector 6.

The selector control circuit 4 provides priority to the access of the font data memory 7 by the font address FA produced by the display address converting circuit 3 or to the access of the font data memory 7 by the CPU address CA1. In this embodiment, when the character code determining circuit 11 determines that the character code data read out from the character code data memory 1 is a specified character code such as a space code ("Null" code), or when the raster address determining circuit 10 determines that the raster address of the character information displayed on the display device 9 is a specified raster address, or when the horizontal/vertical blanking signal is output from the display control circuit 2, the selector control circuit 4 supplies to the address selector 6 a selection control signal SC1 for providing priority to the access of the font data memory 7 by the CPU address CA1 over the access of the font data memory 7 by the font address FA. In addition, when a specified character code such as a space code is detected or when a specified raster address is detected, the selector control circuit 4 supplies to a font data selector 8 a selection control signal SC2 for supplying to the display device 9 the specified font data produced by the font data producing circuit 12 with priority over the font data read out from the font data memory 7.

The selector control circuit 4 carries out a logical OR operation on the basis of a raster address detection signal RADC from the raster address determining circuit 10, a character code detection signal CCDS from the character code determining circuit 11 and the horizontal/vertical blanking signal (indicating the non-display period) BS from the display control circuit 2. As a result of the logical OR operation, the selection control signal SC1 for selecting the CPU address CA1 and the selection control signal SC2 for selecting the specified font data FD are output. Neither the specified character nor specified raster address is detected, the access of the font data memory 7 by the font address FA is carried out, and the font data read out from the font data memory 7 is supplied to the display device 9 via a font data bus 106 and the font data selector 8.

The address selector 5 selects one of the CPU address CA1 and display address DA to be supplied to the character code data memory 1. The address selected by the address selector 5 is supplied to the character code data memory 1. The address selection is performed such that, for example, the selection signals for selecting the CPU address CA1 and display address DA are output from the CPU 20 to the address selector 5 in a timesharing manner.

The address selector 6 selects the CPU address CA1 or font address FA supplied to the font data memory 7 or option memory 13. When the selection control signal SC1 is supplied from the selector control circuit 4, the CPU address CA1 is selected. In other cases, the font address FA is selected. The address selected by the address selector 6 is supplied to the font data memory 7 or option data memory 13.

As is shown in FIG. 4, the font data memory 7 stores font data representing a display character having an upper space (raster addresses 0 and 1) and a lower space (raster addresses 26 to 31). The font data memory 7 is accessed in response to one of the CPU address CA1 and font address FA selected by the address selector 6. The font data read out from the font data memory 7 in response to the font address FA is supplied to the display device 9 via the font data selector 8. The font data read out from the font data memory 7 in response to the CPU address CA1 is supplied to a system bus 21 via the font data bus 106, a driver 22 and a CPU data bus 100.

The font data selector 8 selects font data to be supplied to the display device 9. In this case, when the specified character code such as the space code is detected or when the specified raster address is detected, the specified font data FD produced by the font data producing circuit 12, instead of the font data read out from the font data memory 7, is selected in response to the selection control signal SC2 supplied from the selector control circuit 4.

Figure 2:
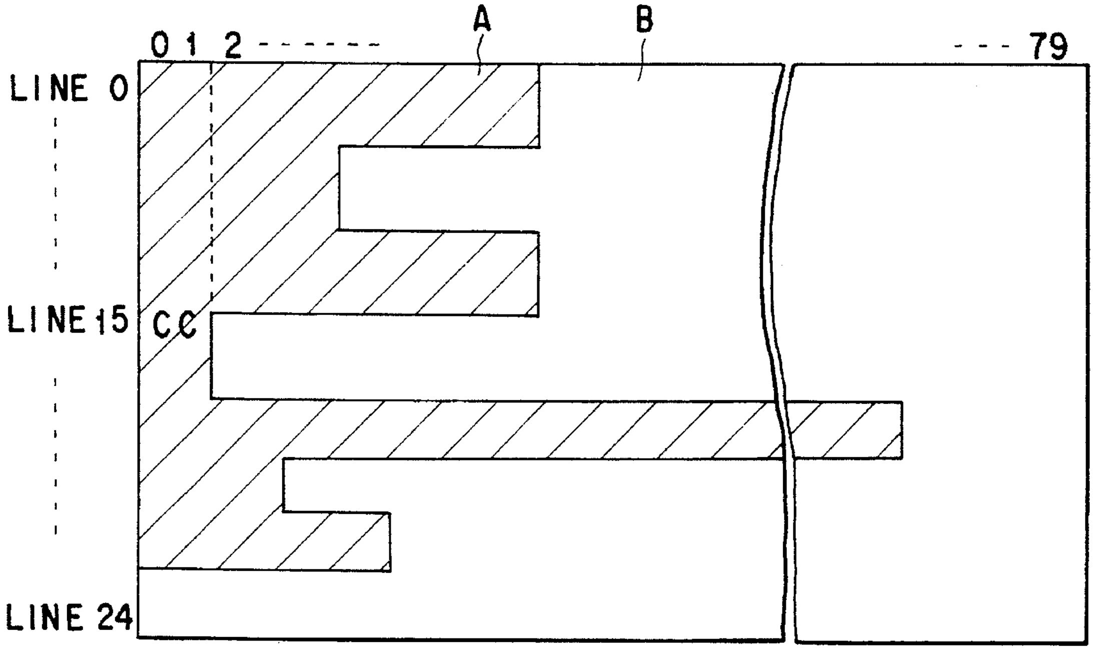
FIG. 2 shows an example of image displayed on a display device of the display control system shown in FIG. 1.

The display device 9 displays character information in accordance with the font data supplied via the font data selector 8. For example, character information is displayed in a display format as shown in FIG. 2.

The raster address determining circuit 10 determines whether or not the raster address of the character information displayed on the display device 9 is the specified raster address. When the specified raster address (raster addresses 0, 1, 26 to 31 in FIG. 4) is detected while the character information is being displayed, a raster address detection signal RADS is output to the selector control circuit 4. The raster address determining circuit 10 has a specified raster address memory 10*a*. A specified raster address is stored in advance in the specified raster address memory 10*a*. Raster addresses supplied successively from the display control circuit 2 are compared with the stored specified raster address, and when both raster addresses coincide, the raster address detection signal RADS is produced.

The character code determining circuit 11 determines whether or not the character code data read out from the character code data memory 1 during the display period. When the specified character code is detected, the character code detection signal CCDS is output to the selector control circuit 4. The character code determining circuit 11 has a specified character code memory 11*a*, and a specified character code is stored in advance in the specified character code data memory 11*a*. The character code data read out from the character code data memory 1 is compared with the stored specified character code, and when both character codes coincide, the character code detection signal CCDS is produced.

The font data producing circuit 12 successively produces specified font data FD such as space data, and successively outputs the produced specified font data FD to the font data selector 8. Accordingly, when the specified character code such as a space code is detected or when the specified raster address is detected, the specified font data FD is supplied to the display device 9 via the font data selector 8.

The option memory 13 stores option font data. For example, font data constituted by 32 rasters, as shown in FIG. 5, is stored in the option memory 13 as option font data. The option memory 13, like the font data memory 7, is accessed in response to the CPU address CA1 or font address FA supplied via the address selector 6.

FIG. 2 shows an example of image displayed on the display device 9. In FIG. 2, symbol A denotes a meaningful character display portion (indicated by hatched lines), and symbol B denotes a meaningless character display portion such as space or a blank character. In this embodiment, while the display portion B is being displayed, the CPU 20 can access the font data memory 7.

Figure 3:
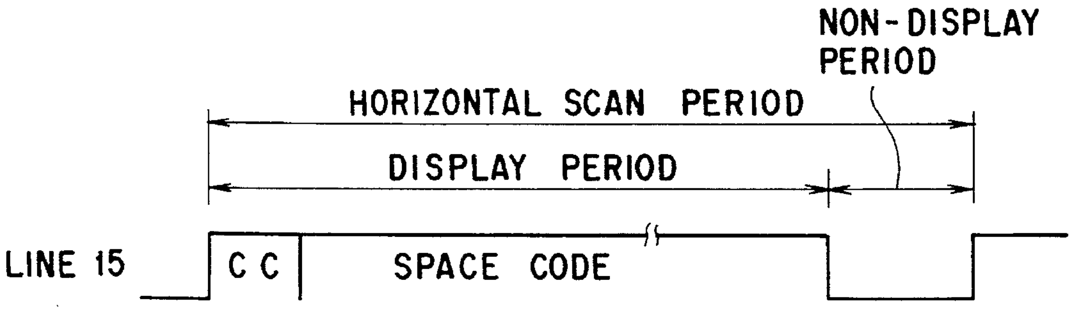
FIG. 3 shows character code data and a horizontal scan period of a line 15 on the display device shown in FIG. 2.

FIG. 3 shows character code data and a horizontal scan period in line 15 of the image shown in FIG. 2. In line 15, the meaningful character display portion A exists in columns 1 and 2, but the meaningless character display portion B exists in the other columns. Thus, during the display period of the display portion B, the CPU 20 can access the font data memory 7.

FIG. 4 shows an example of font data stored in the font data memory 7. The font data comprises 32 rasters. Space areas where no font pattern is formed are provided at raster addresses 0, 1 and 26 to 31.

FIG. 5 shows an example of option font data stored in the option memory 13. Although the option font data comprises 32 rasters, a font pattern is formed in all rasters.

FIG. 6 shows the structure of character code data stored in the character code data memory 1. The content of a specified address x of the character code data is used to access either the font data memory 7 for storing the font data shown in FIG. 4 or the option memory 13 for storing the option font data shown in FIG. 5. For example, when the content of the specified address x of the character code data is "0", the font data memory 7 is accessed, and when the content is "1", the option memory 13 is accessed.

The operation of the display control system including the font data memory access control apparatus according to the first embodiment of the invention will now be described.

The display control circuit 2 produces various display control signals such as display addresses used in the character display mode, horizontal/vertical sync signals, etc. On the basis of the produced display address DA, the character code data stored in the character code data memory 1 is successively read out and supplied to the display address converting circuit.

The display address converting circuit 3 produces the font address FA in accordance with the character code data read out from the character code data memory 1. The produced font address FA is supplied to the font data memory 7 or the option memory 13 via the address selector 6. Thereby, the font data memory 7 or option memory 13 is selectively accessed.

The font data or option font data read out from the font data memory 7 or option memory 13 is supplied to the display device 9 via the font data bus 106 and font data selector 8.

By this processing, the display device 9 displays character information normally, as shown in FIG. 2. As has been stated above, symbol A denotes a meaningful character display portion (indicated by hatched lines), and B the meaningless character display portion such as space portion. A meaningful character "C" is displayed on columns 1 and 2 of one line (line 15), and meaningless characters such as space are displayed on the other columns.

A description will now be given of the access of the font data memory 7 by the CPU 20 during the display of the specified character such as space.

During the display period, when the character code determining circuit 11 determines that the character code data read out from the character code data memory 1 is a space code, priority is provided to the access of the font data memory 7 by the CPU 20 over the access of the font data memory 7 for display of character information on the display device 9.

Accordingly, for example, as shown in FIG. 3, when the character code data read out from the character code data memory 1 is the meaningful character "C", the display address converting circuit 3 produces the font address FA on the basis of the read out character code data, and outputs the produced font address FA to the font data memory 7 or option memory 13 via the address selector 6.

When the character code data read out from the character code data memory 1 is a meaningless character such as space, the character code detection signal CCDS is supplied from the character code determining circuit 11 to the selector control circuit 4.

while the meaningless character is being displayed, the selector control circuit 4 supplies to the font data selector 8 the selection control signal SC2 for selecting the specified font data FD from the font data producing circuit 12, and supplies to the font data memory 7 the selection control signal SC1 for selecting the CPU address CA1 via the address selector 6.

By the above operation, the CPU 20 is enabled to access the font data memory 7 during the display of the meaningless character such as space. During the display period, normal display can be maintained since the specified font data FD corresponding to the space code produced by the font data producing circuit 12, in place of the font data read out from the font data memory 7, is supplied to the display device 9.

Next, a description will now be given of the access of the font data memory 7 by the CPU 20 during the display of specified rasters (raster addresses 0, 1 and 26–31 in this embodiment) of the font data.

When the character code data read out from the character code data memory 1 is a character code for reading out font data from the font data memory 7, it is not necessary to display a font pattern during the display period of specified rasters at raster addresses 0, 1 and 26 to 31, as can be seen from the font data shown in FIG. 4, if the display timing is not degraded.

The raster address determining circuit 10 outputs the raster address detection signal RADS to the selector control circuit 4 when it determines that the character code data is the character code (the content of the specified address x shown in FIG. 6 is "0") for reading out font data from the font data memory 7 and that the raster address RA supplied from the display control circuit 2 is the specified raster address 0, 1, 26 to 31.

When the selector control circuit 4 receives the raster address detection signal RADS, the selection control signal SC2 for selecting the specified font data FD is supplied to the font data selector 8 during the display of the specified raster, and the selection control signal SC1 for selecting the CPU address CA1 is supplied to the address selector 6.

By the above operation, during the display of the specified raster, the CPU 20 can access the font data memory 7 or option memory 13. During the display period of the specified raster, the specified font pattern data FPD corresponding to the space pattern produced by the font data producing circuit 12, in place of the font data read out from the font data memory 7, is supplied to the display device 9. Thus, normal display is maintained.

When the character code data read out from the character code data memory 1 is the character code (the content of the specified address x shown in FIG. 6 is "1") for reading out font data from the option memory 13, the raster address detection signal RADS is not output from the raster address determining circuit 10. Thus, the font data read out from the font data memory 7 is supplied to the display device 9 via the font data selector 8.

In addition to the above access control, access by the CPU 20 is enabled in the non-display period such as horizontal/vertical blanking period. This access is performed in the same manner as in the conventional apparatus.

Figure 7:
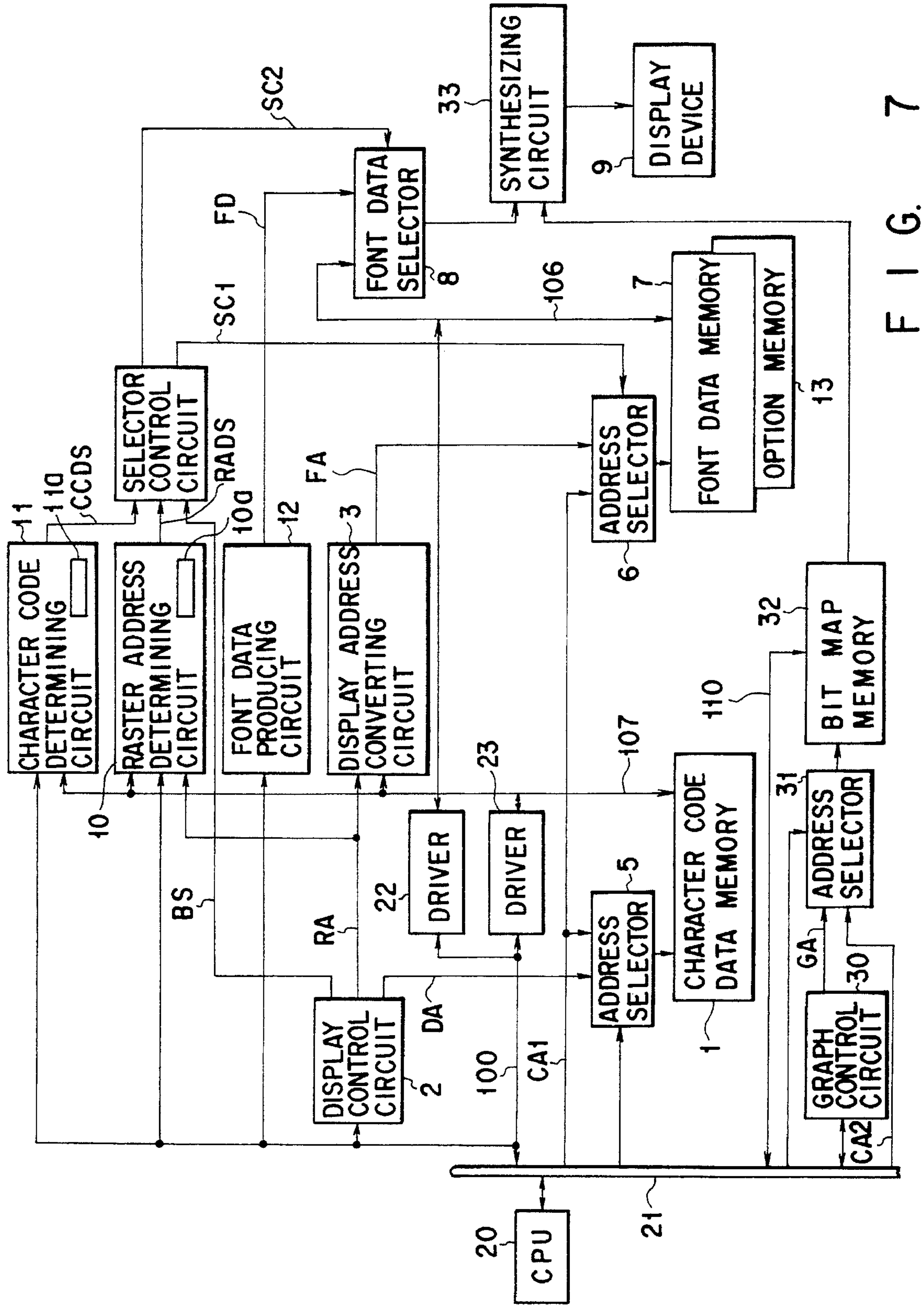
FIG. 7 is a block diagram showing the structure of a display control system including a font data memory access control apparatus according to a second embodiment of the present invention.

FIG. 7 is a block diagram showing the structure of a display control system including a font data memory access control apparatus according to a second embodiment of the invention. As compared with the display control system according to the first embodiment shown in FIG. 1, the display control system according to the second embodiment shown in FIG. 2 further comprises a graph control circuit 30, an address selector 31, a bit map memory 32 and a synthesizing circuit 33. Accordingly, the display control system shown in FIG. 7 can employ both the character display mode and the bit map memory display mode.

The bit map memory 32 stores graphic data representing graphic information to be displayed on the display device 9. During detection of the specified character code, during detection of the specified raster address and during non-display period, font data read out from the font data memory 7 (or option memory 13) which is accessed by the CPU 20 is stored as graph data in the bit map memory 32 via the font data bus 106, driver 22, CPU data bus 100, system bus 21 and data bus 110. Since one dot on the display screen of the display device 9 corresponds to one bit of the bit map memory 32, the graphic data stored in the bit map memory 32 is directly displayed as graphic information on the display screen of the display device 9.

The graph control circuit 30 produces a control signal to be used in the bit map memory display mode. During display period, a graph address GA for successively reading out graphic data stored in the bit map memory 32 is produced and supplied to the bit map memory 32 via the address selector 31.

The address selector 31 selects one of the CPU address CA2 and graphic address GA to be supplied to the bit map memory 32. The address selected by the address selector 31 is supplied to the bit map memory 32. This selection is performed by enabling the CPU 20 to selectively output the selection signal for selecting the CPU address CA2 or graphic address GA to the address selector 31.

The synthesizing circuit 33 synthesizes the font data read out from the font data memory 7 (or option memory 13) and the graphic data from the bit map memory 32, and supplies the synthesized data to the display device 9.

The display device 9 displays the synthesized data supplied from the synthesizing circuit 33 as synthesized information. Thus, the character information and graphic information is simultaneously displayed on the display screen of the display device 9.

As has been stated above, in addition to the horizontal/vertical blanking period (non-display period), when the character code data read out from the character code data memory 1 is the specified character code such as a space code, or when the raster address of the displayed character information is the specified raster address, the access of the font data memory 7 (or option memory 13) by the CPU 20 is enabled. Thereby, the access time of the font data memory 7 by the CPU 20 is remarkably increased. In addition, storage of font data into the option memory 13 can be performed efficiently. Accordingly, the font data memory can be used with high efficiency.

In the embodiments, only the access of the font data memory by the CPU has been described, in addition to the access of the font data memory for display. However, the present invention is not limited to this, and, for example, access by a DMA device, etc. is possible.

In the present embodiments, the option memory 13 for storing option font data is provided; however, the option memory 13 may not necessarily be required.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display control system having a processor comprising:

display means for displaying characters in accordance with given font data;

output means for outputting character code data corresponding to the characters displayed on the display means;

a font data memory storing accessible font data;

access means for accessing the font data memory so as to read font data corresponding to the character code data outputted from the output means, and for supplying the read font data to the display means;

a font data producing circuit for producing font data representing a blank character;

determining means for determining whether the character code data from the output means indicates a blank character; and control means for, in response to the determining means, preventing the access means from accessing, and supplying the font data produced by the font data producing circuit to the display means, whereby the processor can access the font data memory and read out the font data therefrom while the blank character is currently being displayed on the display means.

2. The system according to claim 1, wherein the output means includes means for outputting raster addresses of character code data;

the font data producing circuit includes a circuit for producing font data representing a raster blank; and the determining means includes means for determining whether a raster address outputted by the second output means indicates the raster blank.

3. The system according to claim 1, further comprising:

a bit map memory for storing font data as graphic data, which is read from the font data memory by access of the processor and is capable of being read; and a synthesis data producing circuit for synthesizing the font data read from the font data memory and the font data read from the bit map memory, so as to produce synthesis data supplied to the display means, wherein the display means displays synthesis information in accordance with the synthesis data supplied by the synthesis data producing circuit.

4. A display control system having a processor comprising:

a character code memory for storing character code data readable in response to a supplied display address for displaying character information;

a font address producing circuit for producing a font address in accordance with the character code data read from the character code memory;

a font data memory for storing font data readable in response to a supplied font address;

display means for displaying character information in accordance with the supplied font data;

determining means for determining whether the character code data read from the character code memory indicates a character blank;

a font data producing circuit for producing font data representing the character blank;

a font data selector for selecting one of the font data produced by the font data producing circuit and the font data read from the font data memory, in accordance with a determination result of the determining means, so as to supply font data to the display means; and an address selector for selecting one of the font addresses produced by the font address producing circuit and the font address supplied by a processor, in accordance with the determination result of the determining means, so as to supply font data to the font data memory, whereby the processor is capable of accessing the font data memory and reading out the font data therefrom while the blank character is currently being displayed on the display means.

5. The system according to claim 4, wherein the determining means includes means for determining whether a raster address included in the character code data indicates a raster blank, and the font data producing circuit includes a circuit or producing font data representing the raster blank, whereby the processor is capable of accessing the font data memory while the character blank and the raster blank are currently being displayed on the display means.

6. The system according to claim 4, further comprising:

a bit map memory for storing font data as graphic data, which is read from the font data memory by access of the processor; and a synthesis data producing circuit for synthesizing the font data read from the font data memory and the font data read from the bit map memory, so as to produce synthesis data supplied to the display means, wherein the display means displays synthesis information in accordance with the synthesis data supplied by the synthesis data producing circuit.

7. A display control system having a processor or comprising:

a character code memory for storing character code data which is capable of being read in response to a supplied display address for displaying character information;

a font address producing circuit for producing a font address in accordance with the character code data read from the character code memory;

a font data memory for storing font data readable in response to a supplied font address;

display means for displaying character information in accordance with supplied font data;

determining means for determining whether the character code data read from the character code memory indicates a blank character;

a font data producing circuit for producing font data representing the blank character;

font data selecting means for supplying the font data produced by the font data producing circuit to the display means when the determining means determines that the character code data indicates the blank character, and supplying the font data read from the font data memory to the display means when the determining means determines that the character code data does indicate a blank character; and address selecting means for supplying the font address produced by the font address producing circuit to the font data memory when the determining means determines that the character code data indicates the blank character, and supplying font address supplied by the processor to the font data memory when the determining means determines that the character code data indicates the blank character, whereby the processor is capable of accessing to the font data memory and reading out the font data therefrom while the blank character is currently being displayed on the display means.

8. The system according to claim 7, wherein the determining means includes means for determining whether a raster address included in the character code data indicates a raster blank, and the font data producing circuit includes a circuit for producing font data representing the raster blank, whereby the processor is capable of accessing to the font data memory and reading out the font data therefrom while the blank character and the raster blank are currently being displayed on the display means.

9. The system according to claim 7, further comprising:

a bit map memory for storing font data as graphic data, which is read from the font data memory by the processor; and a synthesis data producing circuit for synthesizing the font data read from the font data memory and the font data read from the bit map memory, so as to produce synthesis data being supplied to the display means, wherein the display means displays synthesis information in accordance with the synthesis data supplied by the synthesis data producing circuit.

10. A method of allowing a processor to access a font data memory for another purpose while character information is currently being displayed on a display in accordance with given font data, the method comprising the steps of:

supplying character code data corresponding characters to be displayed on the display;

storing accessible font data in a font data memory;

accessing the font data memory to read font data corresponding to the supplied character code data and supplying the read font data to the display;

producing font data representing a blank character;

detecting the supplied character code data indicating the blank character; and in case the character code data indicating the character blank is detected, preventing accessing in the accessing step, and supplying the produced font data to the display, whereby the processor can access the font data memory and read out the font data therefrom while the blank character is currently being displayed on the display means.

11. The method according to claim 10, wherein the supplying step includes a step for supplying raster addresses included in the character code data;

the producing step includes a step for producing font data representing a raster blank; and the detecting step includes a step for detecting supplied raster address indicating the raster blank, whereby the processor is capable of accessing the font data memory and reading out the font data therefrom while the blank character and the raster blank are currently being displayed on the display.

12. The method according to claim 10, further comprising the steps of:

storing font data from the font data memory in a bit map memory by the access of the processor; and producing synthesis data by synthesizing font data from the font data memory and from the bit map memory, so as to supply font data to the display.

13. A method for allowing accessing of a font data memory while character information is currently being displayed on a display, the method comprising the steps of:

first storing character code data readable in response to a supplied display address for displaying character information;

first producing a font address in accordance with the character code data;

second storing font data readable in response to a supplied font address;

determining whether the character code data read in the first storing step indicates a blank character;

second producing font data representing the blank character;

first selecting one of the produced font data in the second producing step and read font data in the second storing step, in accordance with a determination result of the determining step, so as to supply font data to the display;

displaying character information on the display in accordance with the font data supplied in the first selecting step; and second selecting one of the font addresses produced in the first producing step and the font address supplied by a processor, in accordance with the determination result in the determining step, so as to supply font data to the font data memory, whereby the processor is capable of accessing the font data memory and reading out the font data therefrom while the blank character is currently being displayed on the display.

14. The method according to claim 13, wherein the determining step includes a step for determining whether a raster address included in the character code data indicates a raster blank, and the second producing step includes a step for producing font data representing the raster blank, whereby the processor is capable of accessing the font data memory and reading out the font data therefrom while the blank character and the raster blank are currently being displayed on the display.

15. The method according to claim 13, further comprising the steps of:

third storing font data from the font data memory to a bit map memory by the access of the processor; and third producing synthesis data by synthesizing font data from the font data memory and from the bit map memory, so as to supply to the display.

16. A display control system having a processor comprising:

display means for displaying characters in accordance with given font data;

output means for outputting raster addresses of character code data corresponding to the characters displayed on the display means;

a font data memory for storing accessible font data;

access means for accessing the font data memory so as to read font data corresponding to the raster addresses outputted from the output means, and for supplying the read font data to the display means;

a font data producing circuit for producing font data representing a raster blank;

determining means for determining whether a character raster address outputted by the output means indicates the raster blank; and control means for, in response to the determining means, preventing the access means from accessing, and supplying the font data produced by the font data producing circuit to the display means, whereby the processor can access the font data memory while the raster blank is currently being displayed on the display means.

17. A display control system having a processor comprising:

display means for displaying characters in accordance with given font data;

output means for outputting raster addresses of character code data corresponding to the characters displayed on the display means;

a font data memory for storing accessible font data;

access means for accessing the font data memory so as to read font data corresponding to the raster address outputted from the output means, and for supplying the read font data to the display means;

a font data producing circuit for producing font data representing a raster blank;

determining means for determining whether a character raster address outputted by the output means indicates the raster blank;

a bit map memory for storing font data which is read from the font data memory as graphic data by the processor;

control means for, in response to the determining means, preventing the access means from accessing, and supplying the font data produced by the font data producing circuit to the display means, whereby the processor can access the font data memory while the raster blank is currently being displayed on the display means; and a synthesis data producing circuit for synthesizing the font data from the font data memory and graphic data from the bit map memory, to produce synthesis data supplied to the display means, wherein the display means display synthesis information in accordance with the synthesis data from the synthesis data producing circuit.

18. A display control system having a processor comprising:

display means for displaying characters in accordance with given font data;

output means for outputting character code data corresponding to the characters displayed on the display means;

a font data memory storing accessible font data;

access means for accessing the font data memory so as to read font data corresponding to the character code data outputted from the output means, and for supplying the read font data to the display means;

a font data producing circuit for producing font data representing a blank character;

determining means for determining whether the character code data from the output means indicates a blank character;

a bit map memory for storing font data which is read from the font data memory as graphic data by the processor;

control means for, in response to the determining means, preventing the access means from accessing and for supplying the font data produced by the font data producing circuit to the display means, whereby the processor can access the font data memory and read out the font data therefrom while the blank character is currently being displayed on the display means;

a synthesis data producing circuit for synthesizing the font data read from the font data memory and the font data read from the bit map memory, so as to produce synthesis data supplied to the display means, wherein the display means displays synthesis information in accordance with the synthesis data supplied by the synthesis data producing circuit.

* * * * *

UNITED STATES PATENT AND TRADEMARK OFFICE

CERTIFICATE OF CORRECTION

PATENT NO. : 5,619,721

DATED : April 08, 1997

INVENTOR(S) : Kinya MARUKO

It is certified that error appears in the above-indentified patent and that said Letters Patent is hereby corrected as shown below:

In Claim 5, Col. 10, line 24, after "circuit" (second occurrence), "or" should read --for--.

In Claim 7, Col. 10, line 41, after "processor", delete "or".

In Claim 7, Col. 10, line 66, "data does" should read --does not--.

In Claim 10, Col. 11, line 39, after "corresponding", insert --to--.

In Claim 11, Col. 11, line 64, after "accessing", insert --to--.

Signed and Sealed this

Fourteenth Day of October, 1997

Attest:

BRUCE LEHMAN

*Attesting Officer*

*Commissioner of Patents and Trademarks*